(12) United States Patent
Hamada et al.

(10) Patent No.: US 9,002,779 B2
(45) Date of Patent: Apr. 7, 2015

(54) INFORMATION PROCESSING APPARATUS, INFORMATION PROCESSING METHOD, AND COMPUTER PROGRAM

(75) Inventors: Masaaki Hamada, Tokyo (JP); Norifumi Kikkawa, Tokyo (JP); Yoshiki Tanaka, Tokyo (JP); Takehiko Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1409 days.

(21) Appl. No.: 10/543,565

(22) PCT Filed: Dec. 16, 2003

(86) PCT No.: PCT/JP03/16084
§ 371 (c)(1),
(2), (4) Date: Apr. 3, 2006

(87) PCT Pub. No.: WO2004/068843
PCT Pub. Date: Aug. 12, 2004

(65) Prior Publication Data
US 2006/0184532 A1    Aug. 17, 2006

(30) Foreign Application Priority Data

Jan. 28, 2003  (JP) .................................. P2003-19051

(51) Int. Cl.
*G06F 7/00* (2006.01)
*H04N 1/32* (2006.01)
*G06F 17/30* (2006.01)
*G06F 3/14* (2006.01)
*H04N 1/00* (2006.01)

(52) U.S. Cl.
CPC ...... *H04N 1/32512* (2013.01); *G06F 17/30244* (2013.01); *G06F 3/1454* (2013.01); *G09G 2340/14* (2013.01); *H04N 1/00244* (2013.01); *H04N 1/32101* (2013.01); *H04N 2201/3243* (2013.01); *H04N 2201/3278* (2013.01)

(58) Field of Classification Search
CPC .................................................. G06F 17/30244
USPC .................................................. 707/102, 602
See application file for complete search history.

(56) References Cited

U.S. PATENT DOCUMENTS 5,757,379 A * 5/1998 Saito ............................. 345/645
2002/0019833 A1 2/2002 Hanamoto

FOREIGN PATENT DOCUMENTS

| JP | 05-328098 | 12/1993 |
|----|-----------|---------|
| JP | 8-139885  | 5/1996  |
| JP | 10-150551 | 6/1998  |

(Continued)

*Primary Examiner* — Ajith Jacob
(74) *Attorney, Agent, or Firm* — Finnegan, Henderson, Farabow, Garrett & Dunner, L.L.P.

(57) ABSTRACT

To provide an apparatus and method for efficiently displaying image content, which is sent and received between a server and a client, in a correct direction. An image content providing server stores, as property information, original angle information indicating correct directions of image content as metadata of the image content. The server generates content information including the original angle information and sends the generated content information to a client. This allows the client to understand the correct direction of the image content received from the server, and to obtain and display image data in the correct direction by performing rotation processing in the client device based on the obtained information or to request the server to perform the rotation processing.

5 Claims, 13 Drawing Sheets

(56) References Cited

FOREIGN PATENT DOCUMENTS

| JP | 2001-325297 | 11/2001 |
| JP | 2002-49907 | 2/2002 |
| JP | 2002-91990 | 3/2002 |
| JP | 2002-304628 | 10/2002 |
| WO | WO 01/95609 A1 | 12/2001 |

* cited by examiner

| Property Name | Type | Multiple | Property Description |
|---|---|---|---|
| protocol Info | string | no | information concerning file format (MIME-Type) |
| codec | string | no | codec information |
| size | unsigned long | no | resource size information |
| resolution | resolution | no | image resolution information |
| original Angle | integer | no | information indicating which degree the correct image is rotated with respect to the image provided to the client |

| Property Name | Type | Multiple | Property Description |
|---|---|---|---|
| image Convert Settings | string | no | set image rotation processing mode for server |

FIG. 7

| Convert Code | Description |
|---|---|
| 0x0000 0001 | Rotate clockwise 90 degrees |
| 0x0000 0002 | Rotate clockwise 180 degrees |
| 0x0000 0003 | (Rotate clockwise 90+180=270 degrees (rotate counterclockwise 90 degrees)) |
| 0x0000 0004 | Horizontal inversion |
| 0x0000 0008 | Vertical inversion |
| Others | Reserved |

FIG. 8

INFORMATION PROCESSING APPARATUS, INFORMATION PROCESSING METHOD, AND COMPUTER PROGRAM

TECHNICAL FIELD

The present invention relates to an information processing apparatus, an information processing method, and a computer program. More particularly, the invention relates to an information processing apparatus, an information processing method, and a computer program in which, in a system for sending and receiving image content between network-connected devices, a server, which provides image content to a client, has correct angle information (original angle) for images and sends the information to the client so as to allow a client to perform optimal image display processing.

BACKGROUND ART

Due to the widespread use of data communication networks, so-called home networks, in which household electric appliances, computers, and peripheral devices are connected in a household via a network so that they can communicate with each other, are becoming common. In the home network, network-connected devices communicate with each other to share the data processing functions of the devices, and content can be sent and received between the devices, thereby providing a convenient and comfortable environment to the users. It is expected that home networks will become more widespread.

As a protocol suitable for such home networks, the Universal Plug and Play (UPnP) is known. The Universal Plug and Play facilitates the construction of a network without requiring complicated operations and allows network-connected devices to receive services provided by the devices without requiring difficult operations or settings. UPnP is also advantageous in that devices can be easily added without being dependent on an OS (operating system) of the devices.

The UPnP allows connected devices to exchange definition files compliant with XML (extensible Markup Language) and to identify each other. An overview of the UPnP processing is:

(1) addressing processing for obtaining a device ID, such as an IP address, of a subject device;

(2) discovery processing for searching for devices on a network and receiving a response from each device to obtain information concerning a device type and function contained in the response; and (3) service request processing for requesting each device to provide services based on the information obtained in the discovery processing.

By following the above-described processing procedure, the provision and reception of services by using network-connected devices can be implemented. A new device to connect to a network obtains a device ID by performing the addressing processing and obtains information concerning the other network-connected devices by performing the discovery processing so that it can request the other devices to provide services based on the obtained information.

For example, if content, such as music data or image data, stored in a server is played back in a client device, a client requests the server to send content information stored in the server, such as titles and artist names of music pieces or movies, data compression format information (ATRAC: adaptive transform acoustic coding, MPEG: moving picture experts group, etc.), and, if necessary, various content attribute information, such as copyright information. Such attribute information is referred to as "metadata" or "meta information".

The server sends metadata (attribute information) concerning the content owned by the server in response to the request from the client. The client displays content information on a display of the client device based on the metadata obtained from the server according to a predetermined display program. For example, a music list including artist names, titles, etc. or an image data list is displayed on the display. The user checks or selects content to be played back based on the display information and sends a request to send the content to the server. The server receives the content request from the client and sends the content to the client in response to the received request. Then, the received content is played back in the client.

Content stored in the server within a home network can be accessed from another device connected to the network. For example, content can be obtained by a device performing a UPnP connection, which is the above-described simple device connection. Content includes various data, such as still image data, moving picture data, for example, movies, and music data, and a client as a network-connected device, for example, a display or a player, can obtain various items of content from the server to play back images and sound.

The server can store image data files, for example, photographs taken by users or image data obtained via, for example, the Internet. The stored image data can be displayed in a client, for example, a PC, provided with a display. The client requests the server to send image data, and the image data is sent from the server to the client and is displayed on the display of the client.

However, if image data, for example, an abstract picture or a photograph of a starry sky, is displayed on a client device, such as a PC, it may be difficult for the user to check whether the image is displayed at a correct angle, that is, whether it is displayed vertically and horizontally in correct directions. Generally, an image display program displaying images in an information processing apparatus, such as in a PC, changes the directions of images by, for example, rotating them by 90°, 180°, 270°, or 360°. While such rotation processing is being performed, the user may find it difficult to recognize the original angle of the image depending on the type of image data.

When sending image data from the server to a client, the server may change the angle of an image before sending it to the client. If the changed image data is sent and is directly displayed in the client, it is displayed at an incorrect angle. Even if the user attempts to rotate the image to display it correctly, it may be difficult to do so if he/she does not know the direction of the original image data or the correct image.

If information concerning correct directions of images is not added to various image data to be stored in the server, the user has to understand the correct direction of an image read from the server when the image is displayed and to change the angle. In this case, it may be difficult to do so depending on the image.

As the related art disclosing a configuration in which various additional information is set for image data and is provided, for example, Patent Document 1 (Japanese Unexamined Patent Application Publication No. 2002-91990) is available. Patent Document 1 discloses an on-demand image distribution system in which image information stored in a server is provided to client terminals, and as additional information concerning images stored in the server, titles, staff, machine position information, object position information, etc. are provided. In this document, however, a configuration in which angle information concerning original images or correct image data is provided is not disclosed, and thus, a configuration for solving the above-described problems is not disclosed.

DISCLOSURE OF INVENTION

The present invention has been made in view of the above-described problems inherent in the related art. It is an object of the present invention to provide an information processing apparatus, an information processing method, and a computer program in which, in a system for sending and receiving image content between network-connected devices, a server, which provides image content to a client, has correct angle information (original angles) and sends the information to the client so as to allow a client to perform optimal image display processing.

It is another object of the present invention to provide an information processing apparatus, an information processing method, and a computer program in which a server, which stores and provides image data to a client, has angle information (original angles) indicating the correct directions of images as property information associated with image data, and performs editing processing, such as rewriting this property information, so as to enable the flexible management of images.

According to a first aspect of the present invention, there is provided an information processing apparatus, which serves as a content providing server, for performing content sending processing in response to a request from a client, the information processing apparatus comprising:

a storage unit storing content and metadata as content attribute information;

a data sending/receiving unit performing data sending/receiving processing; and a controller extracting the metadata from the storage unit upon receiving a request to acquire content or content information from the client so as to generate content information to be sent to the client based on property information forming the metadata, wherein the storage unit stores original angle information indicating a correct direction of image content as the property information forming the metadata associated with the content, and the controller generates content information including the original angle information upon receiving a request to acquire image content or image content information from the client, and sends the generated content information via the data sending/receiving unit.

According to an embodiment of the information processing apparatus of the present invention, the storage unit stores, as the original angle information indicating the correct direction of the image content stored in the server, image rotation angle data indicating which degrees and in which direction image data to be sent to the client is rotated to obtain an image in the correct direction, and the controller generates the content information including the original angle information storing the image rotation angle data and sends the generated content information via the data sending/receiving unit.

According to an embodiment of the information processing apparatus of the present invention, the controller generates, as data to be sent to the client, XML (extended Markup Language) data formed of the content information including the original angle information storing the image rotation angle data.

According to an embodiment of the information processing apparatus of the present invention, the controller obtains a convert code as rotation processing angle information stored in a rotation processing request packet received from the client via the sending/receiving unit, performs image rotation processing in accordance with an angle corresponding to the convert code, and sends rotated image data to the client.

According to a second aspect of the present invention, there is provided an information processing apparatus, which serves as a client, for sending a content sending request to a content providing server, the information processing apparatus comprising:

a data sending/receiving unit performing data sending/receiving processing with the content providing server;

a controller generating display information to be displayed on an output unit based on content information received from the server via the data sending/receiving unit; and a display unit outputting and displaying the display information generated by the controller, wherein the controller generates display information including original angle information, which indicates a correct direction of image content, contained in property information forming image content information received from the server.

According to an embodiment of the information processing apparatus of the present invention, the original angle information is image rotation angle data indicating which degrees and in which direction image data received by the client is rotated to obtain an image in the correct direction.

According to an embodiment of the information processing apparatus of the present invention, the controller generates the display information by analyzing XML (extended Markup Language) data formed of the content information including the original angle information received from the server.

According to a third aspect of the present invention, there is provided an information processing apparatus, which serves as a client, for sending a content sending request to a content providing server, the information processing apparatus comprising:

a data sending/receiving unit performing data sending/receiving processing with the content providing server;

a controller generating display information to be displayed on an output unit based on content information received from the server via the data sending/receiving unit; and a display unit outputting and displaying the display information generated by the controller, wherein the controller performs rotation processing to adjust a direction of image content received from the server to a correct direction based on original angle information, which indicates the correct direction of the image content, contained in property information forming image content information received from the server, and outputs the corrected image content to the output unit.

According to an embodiment of the information processing apparatus of the present invention, the original angle information is image rotation angle data indicating which degrees and in which direction image data received by the client is rotated to obtain an image in the correct direction, and the controller performs rotation processing in accordance with an angle corresponding to the image rotation angle data set as the original angle information.

According to a fourth aspect of the present invention, there is provided an information processing apparatus, which serves as a client, for sending a content sending request to a content providing server, the information processing apparatus comprising:

a data sending/receiving unit performing data sending/receiving processing with the content providing server;

a controller generating display information to be displayed on an output unit based on content information received from the server via the data sending/receiving unit; and a display unit outputting and displaying the display information generated by the controller, wherein the controller generates, based on original angle information, which indicates a correct direction of image content, contained in property information forming image content information received from the server, a rotation processing request packet storing rotation angle information corresponding to the original angle information, and sends the generated rotation processing request packet.

According to an embodiment of the information processing apparatus of the present invention, the original angle information is image rotation angle data indicating which degrees and in which direction image data received by the client is rotated to obtain an image in the correct direction, and the controller generates and sends the rotation processing request packet storing the rotation angle information corresponding to the image rotation angle data, which is set as the original angle information.

According to a fifth aspect of the present invention, there is provided an information processing method in a content providing server, comprising:

an information acquisition request receiving step of receiving a request to acquire content or content information from a client;

a content information generating step of extracting, from a storage unit, original angle information indicating a correct direction of image content as property information forming metadata associated with content so as to generate content information to be sent to the client based on information including the original angle information; and a content information sending step of sending the generated content information to the client via a data sending/receiving unit.

According to an embodiment of the information processing method of the present invention, the storage unit stores, as the original angle information indicating the correct direction of the image content stored in the server, image rotation angle data indicating which degrees and in which direction image data to be sent to the client is rotated to obtain an image in the correct direction, and the content information generating step generates the content information including the original angle information storing the image rotation angle data.

According to an embodiment of the information processing method of the present invention, the content information generating step generates, as data to be sent to the client, XML (extended Markup Language) data formed of the content information including the original angle information storing the image rotation angle data.

According to an embodiment of the information processing method of the present invention, the information processing method further comprises:

a step of receiving a rotation processing request packet from the client;

a step of obtaining a convert code as rotation processing angle information stored in the rotation processing request packet;

a step of performing image rotation processing in accordance with an angle corresponding to the convert code; and a step of sending rotated image data to the client.

According to a sixth aspect of the present invention, there is provided an information processing method in a client which performs playback processing for content received from a server, the information processing method comprising:

a reception step of receiving content information from the server;

a display information generating step of generating display information including original angle information, which indicates a correct direction of image content, contained in property information forming the content information received from the server; and a display step of displaying the display information.

According to an embodiment of the information processing method of the present invention, the original angle information is image rotation angle data indicating which degrees and in which direction image data received by the client is rotated to obtain an image in the correct direction.

According to an embodiment of the information processing method of the present invention, the display information generating step generates the display information by analyzing XML (extended Markup Language) data formed of the content information including the original angle information received from the server.

According to a seventh aspect of the present invention, there is provided an information processing method in a client which performs playback processing for content received from a server, the information processing method comprising:

a reception step of receiving content information from the server;

an acquisition step of acquiring original angle information, which indicates a correct direction of image content, contained in property information forming the image content information;

an image conversion processing step of performing rotation processing to adjust a direction of image data received from the server to the correct direction based on the original angle information so as to output the corrected image data to the output unit; and a display step of displaying the image data converted in the image conversion processing step.

According to an embodiment of the information processing method of the present invention, the original angle information is image rotation angle data indicating which degrees and in which direction image data received by the client is rotated to obtain an image in the correct direction, and the image conversion processing step performs rotation processing in accordance with an angle corresponding to the image rotation angle data set as the original angle information.

According to an eighth aspect of the present invention, there is provided an information processing method in a client which performs playback processing for content received from a server, the information processing method comprising:

a reception step of receiving content information from the server;

an acquisition step of acquiring original angle information, which indicates a correct direction of image content, contained in property information forming the image content information; and a packet generating/sending step of generating, based on the original angle information, a rotation processing request packet storing rotation angle information corresponding to the original angle information as a rotation processing request packet to the server, and sending the generated rotation processing request packet.

According to an embodiment of the information processing method of the present invention, the original angle information is image rotation angle data indicating which degrees and in which direction image data received by the client is rotated to obtain an image in the correct direction, and the packet generating/sending step generates and sends the rotation processing request packet storing the rotation angle information corresponding to the image rotation angle data, which is set as the original angle information.

According to a ninth aspect of the present invention, there is provided a computer program executing information processing in a content providing server, comprising:

an information acquisition request receiving step of receiving a request to acquire content or content information from a client;

a content information generating step of extracting, from a storage unit, original angle information indicating a correct direction of image content as property information forming metadata associated with content so as to generate content information to be sent to the client based on information including the original angle information; and a content information sending step of sending the generated content information to the client via a data sending/receiving unit.

According to a tenth aspect of the present invention, there is provided a computer program executing information processing in a client which performs playback processing for content received from a server, the computer program comprising:

a reception step of receiving content information from the server;

a display information generating step of generating display information including original angle information, which indicates a correct direction of image content, contained in property information forming the content information received from the server; and a display step of displaying the display information.

According to an eleventh aspect of the present invention, there is provided a computer program executing information processing in a client which performs playback processing for content received from a server, the computer program comprising:

a reception step of receiving content information from the server;

an acquisition step of acquiring original angle information, which indicates a correct direction of image content, contained in property information forming the image content information;

an image conversion processing step of performing rotation processing to adjust a direction of image data received from the server to the correct direction based on the original angle information so as to output the corrected image data to the output unit; and a display step of displaying the image data converted in the image conversion processing step.

According to a twelfth aspect of the present invention, there is provided computer program executing information processing in a client which performs playback processing for content received from a server, the computer program comprising:

a reception step of receiving content information from the server;

an acquisition step of acquiring original angle information, which indicates a correct direction of image content, contained in property information forming the image content information; and a packet generating/sending step of generating, based on the original angle information, a rotation processing request packet storing rotation angle information corresponding to the original angle information as a rotation processing request packet to the server, and sending the generated rotation processing request packet.

As described above, according to the configuration of the present invention, a content providing server generates content information based on original angle information indicating the correct direction of image content and sends the content information to a client. This allows the client to understand the correct direction of the image content received from the server and to display image data in the correct direction by performing rotation processing based on the information in the client device or requesting the server to perform the rotation processing.

According to an example of the configuration of an embodiment of the present invention, a client generates display information including original angle information, which indicates the correct direction of image content, contained in property information, which is an element of the content information received from the server, and displays the generated display information. This allows the user to adjust the direction of the display image to that of the correct image based on the display information.

According to an example of the configuration of an embodiment of the present invention, a client obtains original angle information indicating the correct direction of image content as property information concerning image content received from the server, and performs rotation processing for adjusting the direction of the image data received from the server to that of the correct image, and outputs the corrected image data to the output unit. Thus, the corrected image can be provided to the client without the need for the user to perform processing.

According to an example of the configuration of an embodiment of the present invention, a client obtains original angle information indicating the correct direction of image content as property information concerning image content received from the server, and sends a rotation processing request packet storing rotation angle information corresponding to the original angle information to the server. Thus, the corrected image can be received from the server and is displayed on the client display even if the client does not have an image rotation processing function.

The computer programs of the present invention are computer programs that can be provided to a general-purpose computer system that can execute various program codes in a computer readable format by using a storage medium, for example, a CD, FD, or MO, a communication medium, for example, a network. By providing such a program in a computer readable format, the processing in accordance with the program can be executed in the computer system.

Other objects, features, and advantages of the present invention will become apparent from the following detailed description based on the following embodiments of the invention taken in connection with the accompanying drawings. In this specification, the system is a logical set of a plurality of devices, and it is not essential that they be in the same housing.

BRIEF DESCRIPTION OF THE DRAWINGS

FIG. 5 illustrates property information forming metadata, which is set in association with content data.

FIG. 7 illustrates conditions for an image conversion processing request property stored in an image rotation processing request packet to be sent from a client to a server.

FIG. 8 illustrates examples of covert code values set in the image conversion processing request property.

BEST MODE FOR CARRYING OUT THE INVENTION

Details of the information processing apparatus, the information processing method, and the computer program of the present invention are described below with reference to the drawings.

[System Overview]

Figure 1:
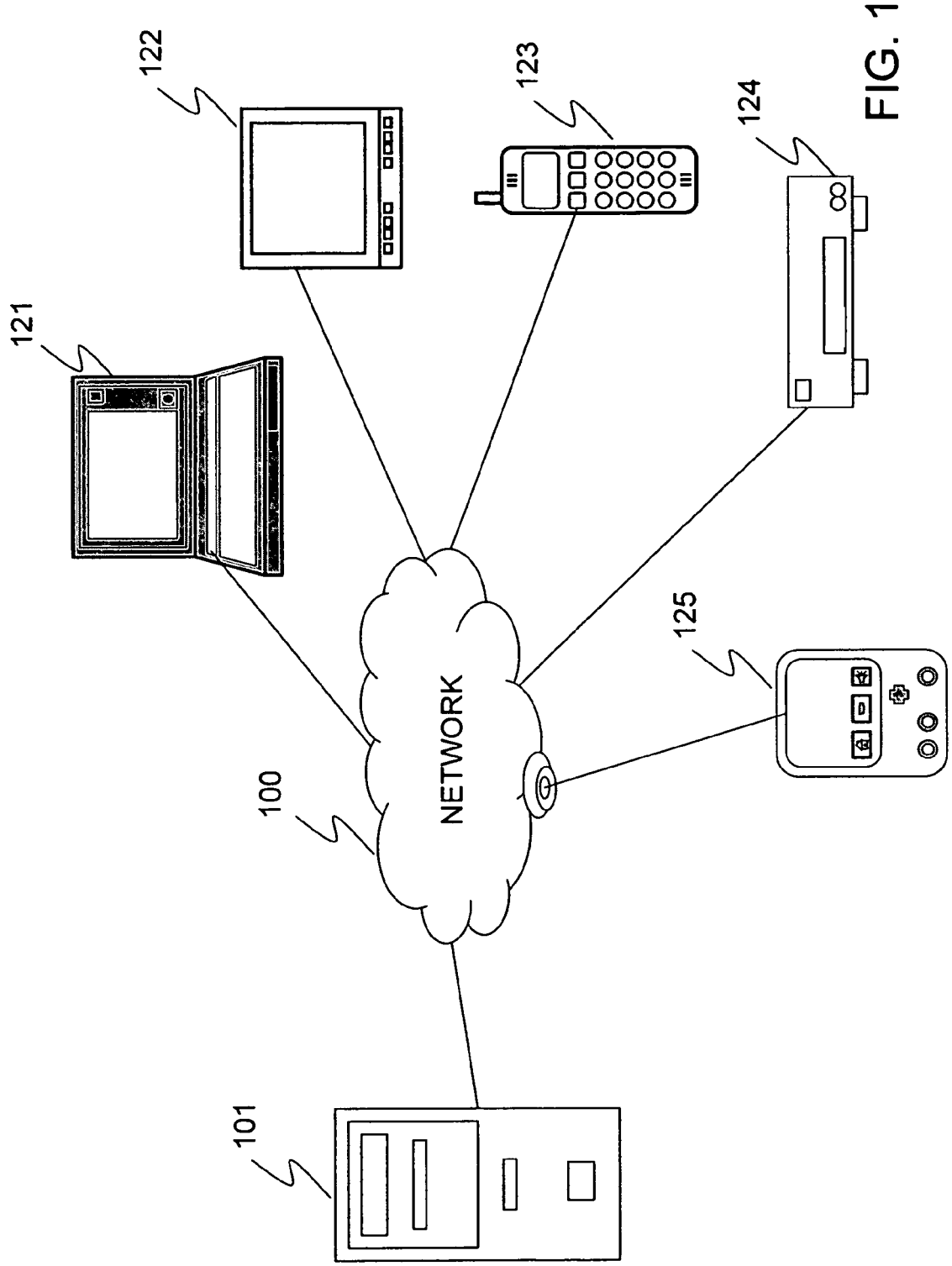
FIG. 1 illustrates an example of a network system to which the present invention is applicable.

A description is first given, with reference to FIG. 1, of an example of a network system to which the present invention is applicable. FIG. 1 illustrates a system, for example, a home network, in which a server 101 executing processing in response to a processing request from various client devices, a PC 121, a monitor 122, a cellular telephone 123, a player 124, and a PDA 125, which serve as client devices to request the server 101 to execute processing, are connected to each other via a network 100. As the client devices, other electronic devices and household electric appliances can be connected.

The server 101 executes processing in response to a request from a client, for example, providing content stored in storage means, such as a hard disk, contained in the server 101, or performing data processing services by running an application program that can be executed by the server. Although in FIG. 1 the server 101 and the client devices are shown in distinction from each other, a device, which provides services requested from a client, is referred to as a server, and any client device providing data processing services of that device to the other clients can be a server. Accordingly, the client devices connected to the network shown in FIG. 1 can be a server.

The network 100 is a wired or wireless network, and the connected devices send and receive communication packets, for example, Ethernet (registered) frames, via the network 100. More specifically, a client sends an Ethernet frame storing processing request information in a data portion of the Ethernet frame to the server 101, thereby requesting the server 101 to execute data processing. Upon receiving the processing request frame, the server 101 executes data processing, and if necessary, it stores result data indicating data processing results in a data portion of a communication packet and sends the packet to the corresponding client.

The network-connected devices are, for example, Universal Plug and Play (UPnP)—compatible devices. Accordingly, it is easy to add or delete devices to or from a network. A new device to connect to the network follows the procedure:

(1) addressing processing for obtaining a device ID, such as an IP address, of a subject device;

(2) discovery processing for searching for devices on a network and receiving a response from each device to obtain information concerning a device type and function contained in the response; and (3) service request processing for requesting each device to provide services based on the information obtained in the discovery processing.

Then, the device can receive services implemented by the network-connected devices.

As an example of an information processing apparatus forming the server or a client shown in FIG. 1, an example of the hardware configuration of a PC is discussed below with reference to FIG. 2.

A CPU (Central Processing Unit) 201 executes various processing jobs according to a program stored in a ROM (Read Only Memory) 202 or an HDD 204 so as to serve as data processing means or communication control processing means. In a RAM 203, programs and data executed by the CPU 201 are stored. The CPU 201, the ROM 202, the RAM 203, and the HDD 204 are connected to each other via a bus 205.

An input/output interface 206 is connected to the bus 205, and an input unit 207 including a keyboard, a switch, a button, or a mouse operated by a user and an output unit 208 including an LCD, a CRT, or a speaker providing various items of information to the user are connected to the input/output interface 206. The input/output interface 206 is also connected to a communication unit 209, which serves as data sending/receiving means, and to a drive 210 on which a removable recording medium 211, such as a magnetic disk, an optical disc, a magneto-optical disk, or a semiconductor memory, is installed to read or write data from or into the removable recording medium 211.

Figure 2:
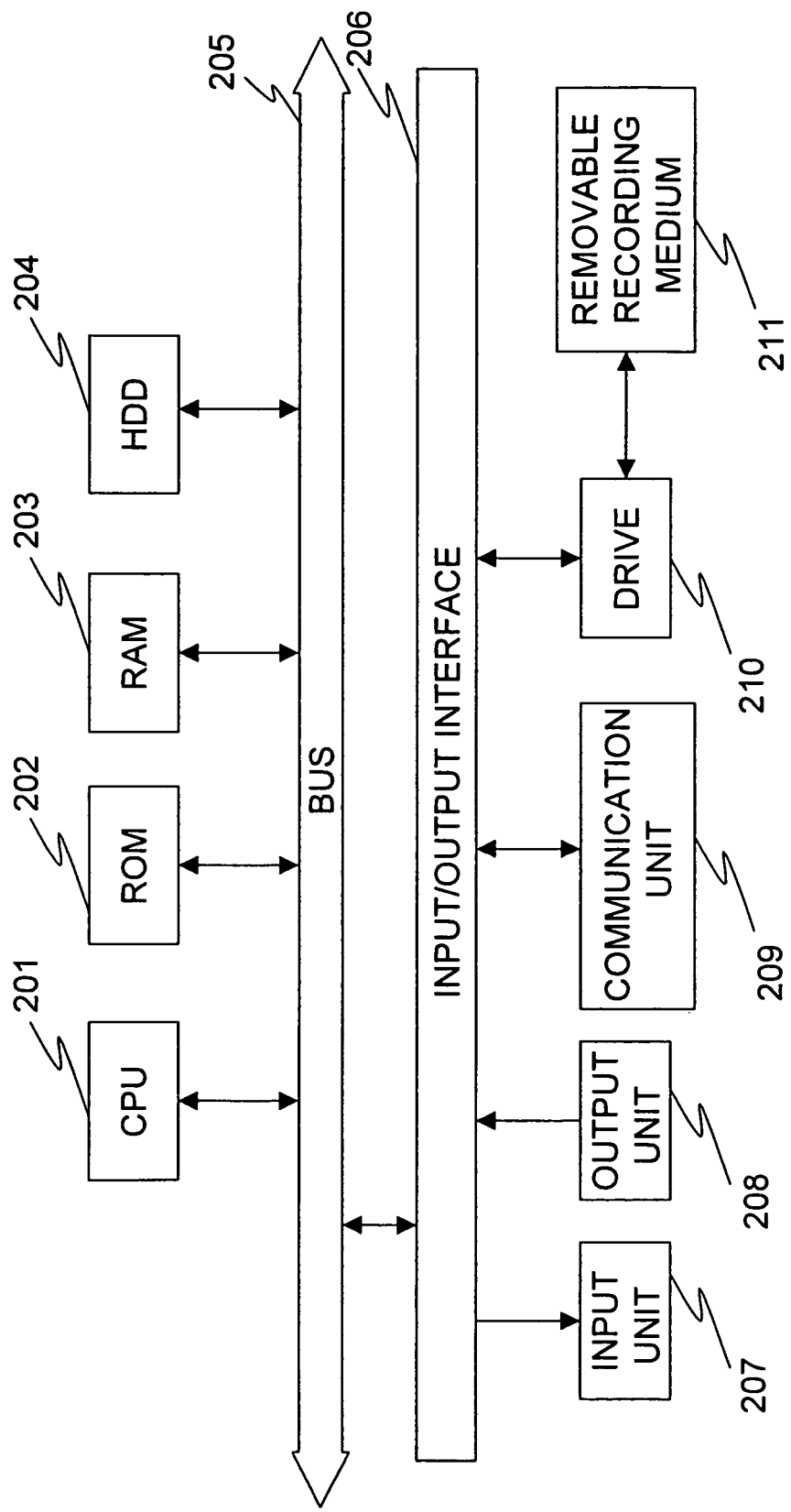
FIG. 2 illustrates an example of the configuration of a network-connected device.

The configuration shown in FIG. 2 is an example of a server or a personal computer (PC) as an example of the network-connected devices shown in FIG. 1. However, the network-connected devices are not restricted to PCs, and may be portable communication terminals, such as cellular telephones or PDAs, various electronic devices, such as players and displays, or other information processing apparatuses, as shown in FIG. 1. Accordingly, the network-connected devices have a hardware configuration unique to the devices, and execute processing according to the hardware.

[Metadata]

Metadata stored in the server, which stores content to be provided to clients, is discussed. The server has, as metadata, attribute information corresponding to each item of content, such as image data, for example, still images and moving pictures, and audio data, for example, music, stored in the storage unit of the server.

Image data, such as still images and moving pictures, and audio data, such as music, contained in the server is collectively referred to as "AV content". In the server, AV content is managed by a content directory having a hierarchical structure.

The content directory has a hierarchical structure including folders storing individual items of AV content or a folder storing a plurality of items of AV content. The individual items of the content directory, i.e., folders storing the individual AV content or a folder storing a plurality of AV content, are referred to as "objects". The object is a generic term of the data unit processed by the server, and there are various objects other than folders storing individual AV content or a folder storing a plurality of AV content.

The smallest unit of the AV content, i.e., a piece of music data, a piece of moving picture data, a piece of still image data, is referred to as an "item".

The objects are subjected to class labeling in which they are divided into classes according to the type of object, for example, music (Audio), video, or photo. A client can designate a specific class to request the server to search only for objects belonging to the specific class. In the server, the classes are managed in a hierarchical structure, and subclasses can be set under each class.

The metadata is management information including attribute information concerning content owned by the server, class definition information, information concerning the hierarchical structure forming a content directory, etc. The metadata as content attribute information defined for each object includes various information concerning the identifier (ID), data size, resource information, title, artist name, copyright information of the content. Each piece of information contained in the metadata is referred to as "property". It has been defined which type of property to form metadata is provided for content according to the type of content, i.e., music (audio), video, photo, etc.

If content is image data, the original angle is contained, as angle information concerning the original image data, in the property forming metadata as content attribute information, and data indicating which degrees the original image data is rotated with respect to the image data sent from the server to a client is stored. Details of such data are discussed below

[Content Playback Processing by Client]

Figure 3:
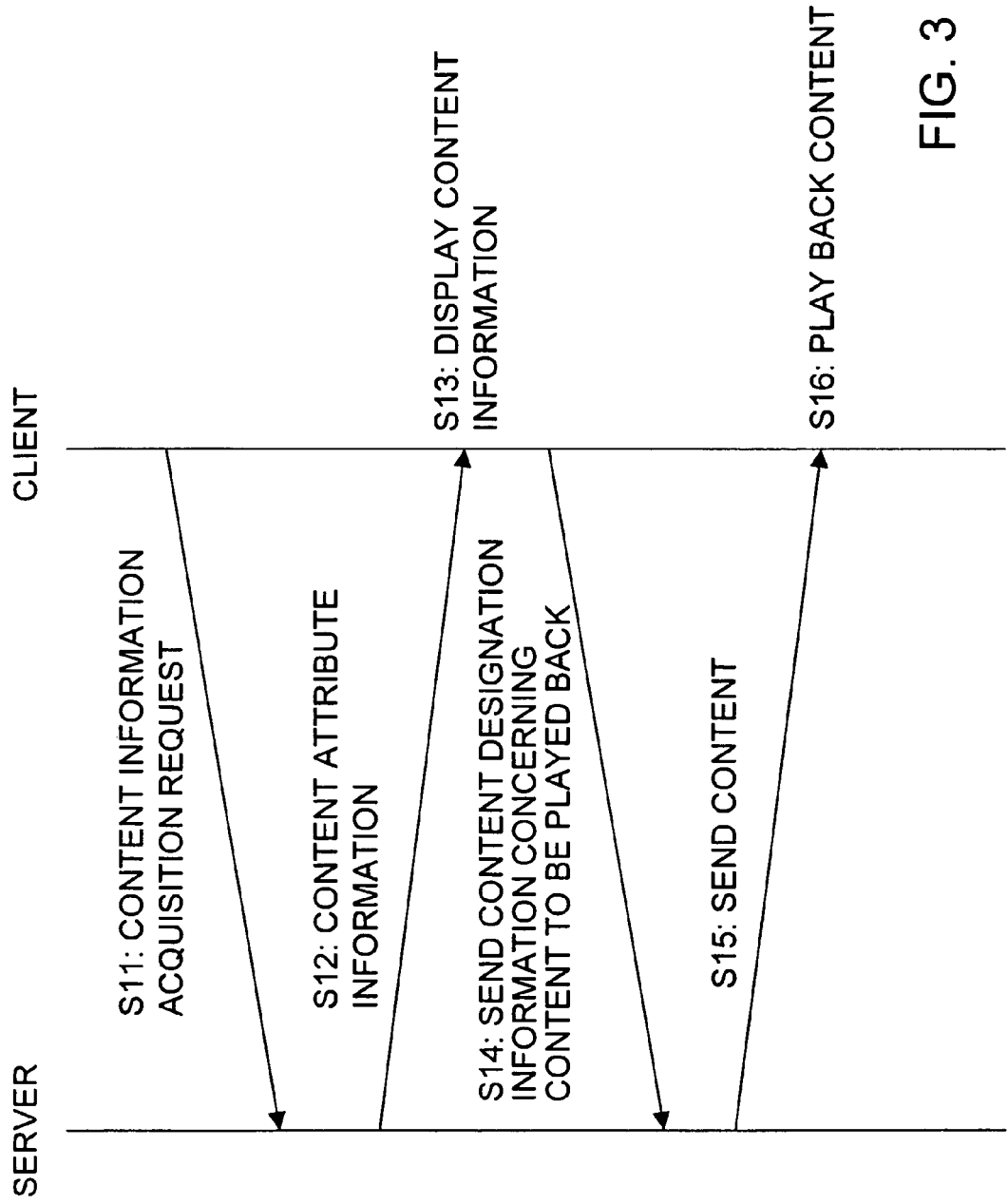
FIG. 3 is a processing sequence between a server and a client in content data playback processing.

A normal content playback processing sequence is first described with reference to FIG. 3. A client, which is to obtain content, such as image data or audio data, from a server and plays it back, requests the server to provide the content and receives the requested content from the server and plays it back.

In step S11, the client sends a request to acquire content information stored in the server. In step S12, in response to the request from the client, the server generates content information, such as titles and artist names, as XML (extended Markup Language) data based on the content metadata, and sends the content information to the client.

In step S13, the client displays the content information on a display according to the received XML information. If the content information is concerned with music content, a list including music titles, artist names, playback times corresponding to a plurality of music pieces stored in the server is displayed. If the content information is concerned with image data, image information concerning titles, photographed time and date, etc., is displayed. Such information is information based on metadata which is stored in the server and which is provided in association with the content stored in the server.

Then, in step S14, the client selects image data or music to be received from the server and to be played back in the client device, and sends content designation information (for example, content ID) to the server. The server obtains the content from the storage means based on the received content designation information and sends the content. In step S16, the client plays back the content received from the server. If the content is subjected to compression processing, such as ATRAC or MPEG, it is decoded in the client and is then played back.

[Image Content Playback Processing]

The normal playback procedure has been discussed. However, if playback content is image data, for example, a photograph, the user has to perform processing, such as rotation processing, for image data displayed in the client device. To perform rotation processing for the image data, if an image display program executed by the client terminal has a rotation processing function, the client can perform rotation processing by using the rotation processing function. Alternatively, the client may request the server to perform rotation processing for the image and to perform image transform processing by using the image transform processing function provided for the server, and then to resend the transformed image data from the server to the client.

A typical image-data display processing sequence including rotation processing for a displayed image is described below with reference to FIG. 4.

In step S21, image data is sent from a server to a client. In step S22, the client displays the received image data on the display of the client. In the configuration of the present invention, if the content is image data, angle information, i.e., the original angle, concerning the original image data is contained as property information forming the attribute information (metadata) of the image data.

The [original angle] information, which is property information, is information indicating which degrees the correct image data or the original image data is rotated with respect to the image data sent from the server to the client. That is, the [original angle] information is information indicating the correct direction of image content.

This property information is sent from the server to the client as XML data together with the image data sent in step S21. Alternatively, it may be sent when sending content information from the server to the client in step S12 in FIG. 3.

The [original angle] as the property information is one element of metadata associated with image content stored in the storage device by the server, and is information stored in the storage device in association with the content by the server.

The server stores various types of property information as content attribute information. The attribute information concerning content data is metadata, and property information is associated with the metadata as one element of the metadata. FIG. 5 illustrates part of the property information associated with the content. The property information is sent from the server to a client in response to a request to obtain property information from the client. Alternatively, the property information is added to content in response to a request to obtain content from the client and is then sent to the client.

FIG. 5 illustrates part of property information provided to a client. The property information includes a property name, a data type indicating whether the data is a numeric value or a character string, multiple indicating whether a plurality of property data can exist, and a property description.

The protocol information (protocol Info) shown in FIG. 5 is information concerning the file format of content, for example, image data. The information concerning the file format is indicated by, for example, MIME Type, more specifically, Photo/JPEG, Audio/Mpeg, Audio/WAV, Audio/X-openmg, Audio/L16, Video/MPEG, or Video/JPEG.

The codec is coding data mode information concerning the content data, and various codec information, such as MPEG1L3, ATRAC3, ATRAC3plus, . . . , JPEG, . . . , MPEG4V, etc., is stored as the data compression processing modes. The size indicates the data size. The resolution is resolution information concerning image data stored in the server, for example, various types of resolution information, such as 1600×1200, 1280×1024, and 800×600, are set.

A data portion 301 shown in FIG. 5 is the original angle information in which information indicating which degrees correct image data or original image data is rotated with respect to the image data sent from the server to the client is stored. For example, angle information indicating 0 to 359 degrees is stored. Alternatively, four types of information, such as 0, 90, 180, and 270 degrees, may be stored.

Such property information is sent, as XML data, in response to a request to send property information from a client, or together with content from the server to the client.

The property information shown in FIG. 5 is information stored in the server as attribute information associated with the content, and is part of information that can be provided to the client. Various types of content information other than that shown in FIG. 5 are provided from the server to the client in response to a request to obtain property information from the client.

Referring back to FIG. 4, the typical image-data display processing sequence including the rotation processing for displayed images is discussed.

Figure 6:
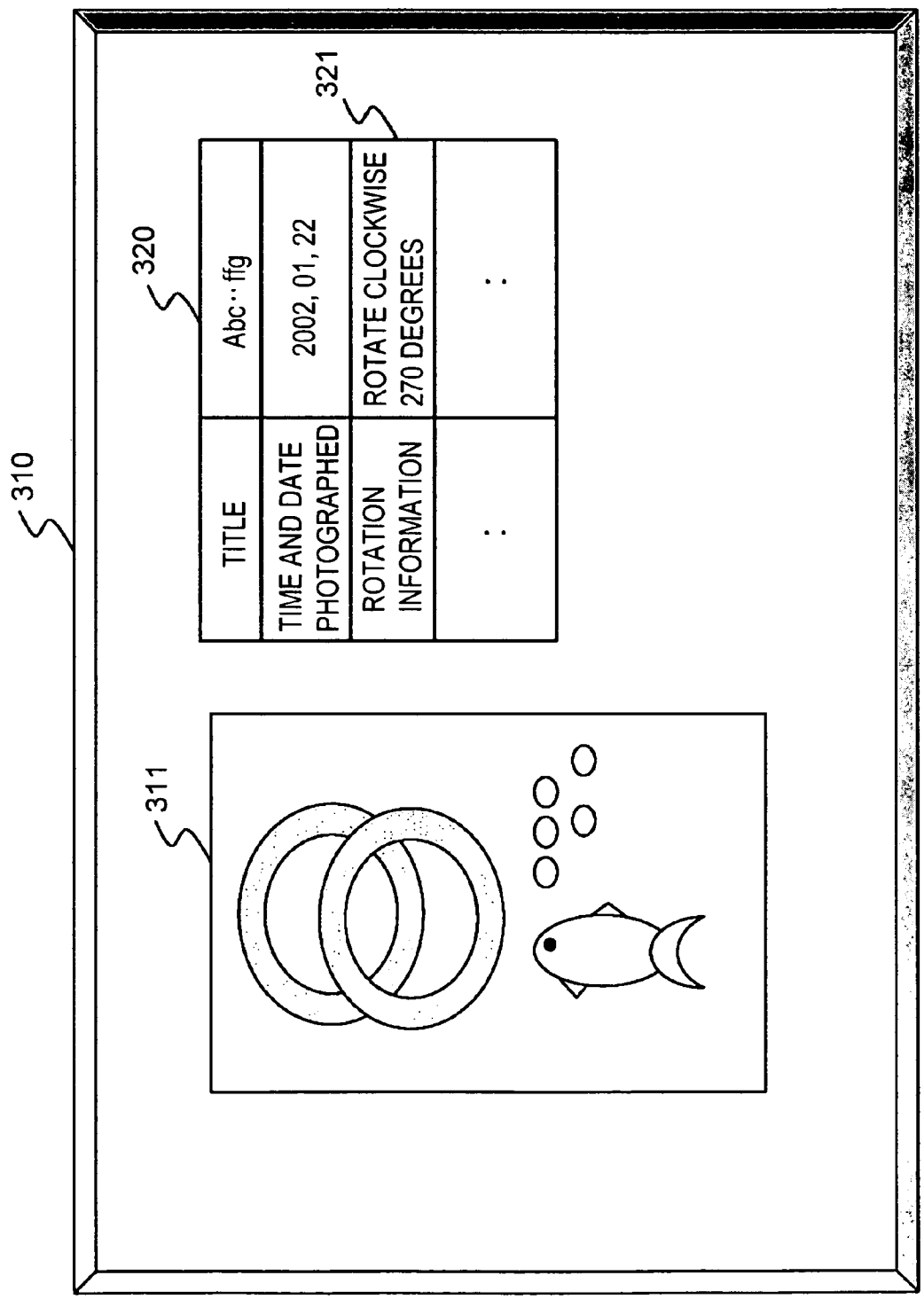
FIG. 6 illustrates examples of image data and image information displayed on a display of a client.

In step S21, upon receiving image data and property information from the server, the client displays the received image data on the display of the client, and also displays image attribute information based on the received property information. An example of the display processing is shown in FIG. 6. The display information; such as that shown in FIG. 6, is generated based on the XML data of the property information received from the server according to a display processing program provided for the client device. Accordingly, the display mode is different depending on the settings of the display processing program.

In the display example shown in FIG. 6, on a display 310 of the client, display image data 311 based on image data received from the server and image information 320 based on the property information received from the server are displayed. The image information includes rotation information generated based on the original angle in the above-described property information.

In this example, correct image data or original image data is an image rotated clockwise 270 degrees with respect to the display image data 311 received from the server.

In this manner, the client can understand based on the property information received from the server that it is necessary to rotate the display image data 311 clockwise 270 degrees to display the image at the correct angle.

If the image display program of the client has an image rotation processing function, the display image data 311 is rotated clockwise 270 degrees based on the property information by performing the rotation processing based on the display program, thereby making it possible to set a correct image angle. Steps S22-2 and S22-3 shown in FIG. 4 are image rotation processing performed by the client based on the property information.

Figure 4:
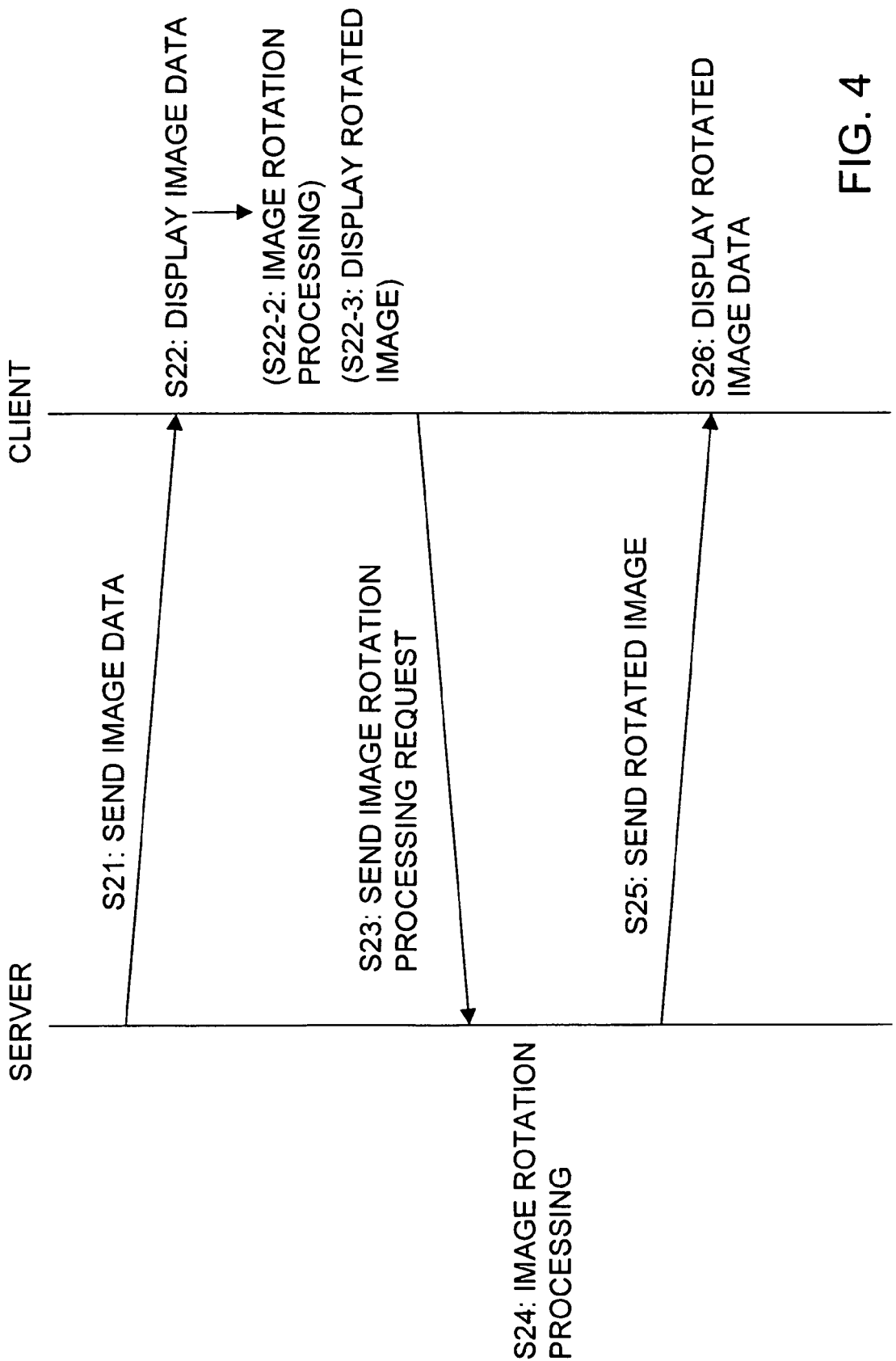
FIG. 4 is a processing sequence between a server and a client accompanying image-data rotation processing.

If the client is not provided with a function of executing image rotation processing, it requests the server to perform image rotation processing, which is processing indicated in steps S23 and the subsequent steps shown in FIG. 4.

When the client requests the server to perform image rotation processing, it is necessary to specify a rotation angle. The client has understood based on the property information received from the server that it is necessary to rotate the display image data 311 clockwise 270 degrees to display the image at the correct angle. Accordingly, the client can send a rotation processing request to perform the rotation processing at a rotation angle of 270 degrees to the server.

The client sends a content processing request packet to the server. In this case, the client sets the rotation angle in the property [image conversion processing (image Convert Settings)] as the rotation processing angle setting information and sends the packet to the server. FIG. 7 illustrates the property [image conversion processing (image Convert Settings)], as the rotation processing angle setting information, set in the content rotation processing request packet.

In FIG. 7, as in FIG. 5 discussed above, the property name, the data type indicating whether the data is a numeric value or a character string, multiple indicating whether a plurality of property data can exist, and the property description are shown. Under the conditions shown in FIG. 7, the client sets the value of the property [image conversion processing (image Convert Settings)] as the rotation processing angle setting information and sends the content processing request packet to the server.

As the value of the property [image conversion processing (image Convert Settings)], specifically, the convert code, which serves as a bit string, specifying the rotation angle is set. Examples of the convert code are shown in FIG. 8.

In the examples shown in FIG. 8, the convert code indicates various processing types that can specify processing by rotating an image clockwise 90 degrees, 180 degrees, and 270 degrees, and can also specify horizontal inversion and vertical inversion. They are examples only, and the convert code may allow detailed settings, such as rotations from 0 to 359 degrees. Alternatively, only four types of information, such as 0, 90, 180, and 270 degrees, may be set.

In the example shown in FIG. 6, it has been understood based on the property information received from the server that the display image data 311 should be rotated clockwise 270 degrees to display the display image data 311 at the correct angle. Accordingly, the client sends a content rotation processing request packet in which the convert code 0x00000003 shown in FIG. 8 is set as the value of the property [image conversion processing (image Convert Settings)] to the server.

Referring back to FIG. 4, the image data display processing procedure accompanying the rotation processing is discussed. In step S23, the client sends a content rotation processing request packet in which the above-described convert code 0x00000003 is set as the value of the property [image conversion processing (image Convert Settings)] to the server.

Upon receiving the packet from the client, the server obtains the value set in the property [image conversion processing (image Convert Settings)] stored in the packet, i.e., the convert code 0x00000003, and understands that the request is to rotate the image clockwise 270 degrees. Then, in step S24, the server rotates the image data clockwise 270 degrees according to the image processing program stored in the server.

In step S25, the server sends the rotated image data to the client. If necessary, the server adds the property information, which serves as the attribute information of this image data, to the image data, and sends the resulting image data as XML data. Upon receiving the rotated image data from the server, in step S26, the client displays the received data on the display of the client.

Figure 9:
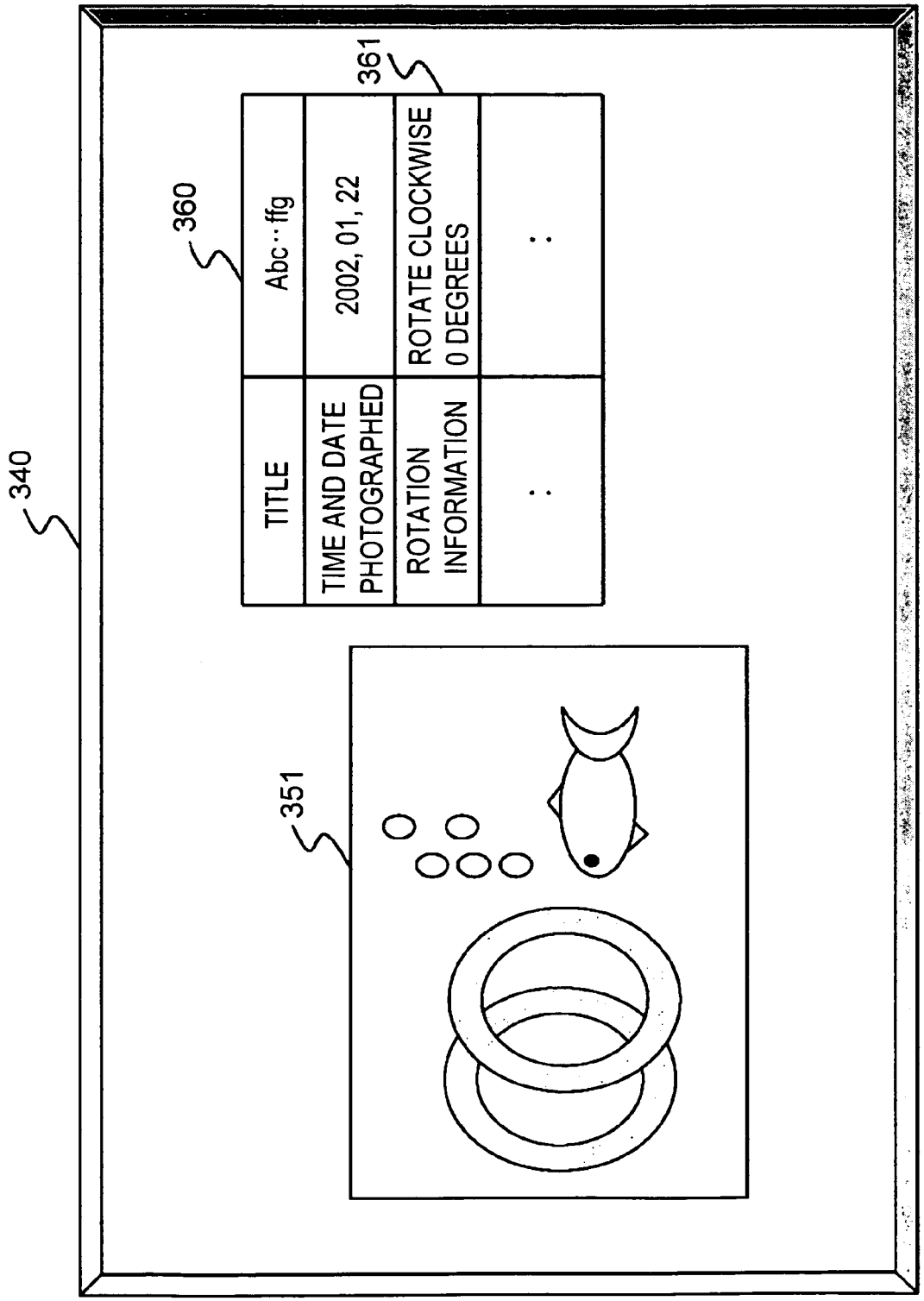
FIG. 9 illustrates examples of rotated image data and image information displayed on a display of a client.

A display example of the rotated image data and the image information based on the newly added property information is shown in FIG. 9.

In the display example shown in FIG. 9, on a display 340 of the client, display image data 351 based on the image data received from the server and image information 360 based on the property information received from the server are shown.

The image information includes rotation information generated based on the original angle in the property information. In this example, the correct image data or the original image data is an image rotated clockwise 0 degrees with respect to the display image data 351 received from the server. That is, the image displayed on the display of the client is display data in the correct direction.

As described above, the rotation angle required for displaying an image at a correct angle is provided to the client from the server based on property information received from the server, and the client can perform rotation processing based on the angle information provided by the server or sends a rotation processing request to the server, thereby making it possible to display original image data in the correct direction.

The original angle information (data portion 301 shown in FIG. 5) in the meta information, which is set in association with the image data stored in the server, is a value that can be set by the user. That is, the user can rewrite the original angle information to a desired value.

For example, when storing new image data in the server, the user can set a desired numeric value in the original angle information corresponding to the stored image data. If the user does not set a value, 0 may be set as a default value.

When storing image data obtained by a device having a function of setting original angle information as attribute information concerning photographed images, such as advanced digital cameras, the original angle information, which serves as attribute information accompanying image data, may be input, together with the image data, from the device, such as a digital camera, and is set based on the input information as metadata associated with the image data stored in the server.

Additionally, the original angle information of image data displayed in a client device may be rewritten in the client, and is sent to the server as updated data, thereby rewriting property information.

For each item of property information, which is set in association with the content stored in the server, editing information indicating whether the property information can be rewritten, added, or deleted is set. More specifically, the following editing codes are set in association with the property information:

w: UpdateObject (information can be rewritten);
a: UpdateObject (information can be added); and
d: UpdateObject (information can be deleted).
[UpdateObject] indicates an updating processing procedure.

The editing code [w: UpdateObject (information can be rewritten)] is assigned to the original angle information in the meta information, which is set associated with the image data stored in the server. The user can perform updating processing by using the server or the client device to rewrite the original angle information in the meta information, which is set for each image data.

Property information sent from the server to a client includes various types of information, and includes data that can be rewritten and data that cannot be rewritten. Those types of data can be distinguished by setting and sending the above-described editing codes [w, a, d] for each property information to be sent to a client, thereby allowing the client to perform display processing in accordance with the editing codes and allowing the user to identify whether the display information can be rewritten.

In the above-described processing example, the user generates display information and includes rotation information in the display information based on the property information received from the server, and selects the type of processing. However, instead of performing the processing by the user, the image display processing program of the client device may automatically execute rotation processing for displaying a correct image based on the property information received from the server. If the client is not provided with a rotation processing function, a rotation processing request packet specifying a rotation angle for displaying a correct image may be generated in the processing program of the client device based on the property information received from the server, and is automatically sent to the server.

The above-described embodiment has been discussed in the context of a still image, such as a photograph, as image data. However, the original angle may also be set for moving picture content as the property information associated with the moving picture content. The original angle information may be sent, together with the moving picture data, from the server to the client, as the property information, thereby allowing the client to adjust the direction of the received data to that of the correct original data, if necessary, and to display the correct original data on the display of the client.

Figure 10:
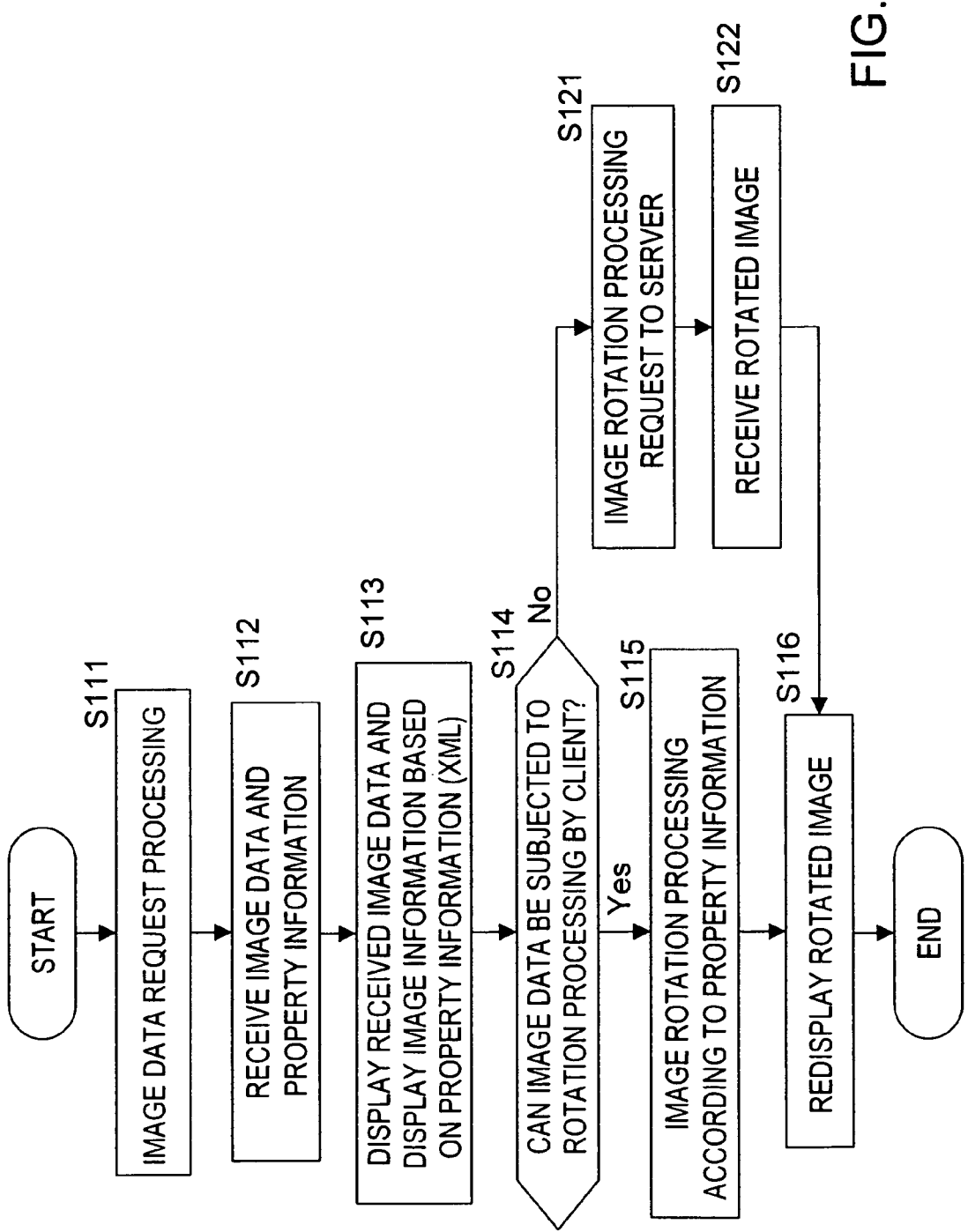
FIG. 10 is a flowchart illustrating a procedure of receiving image data, rotation processing, sending rotation processing request, and displaying rotated image data by a client.

A description is now given, with reference to the flowchart of FIG. 10, of a procedure of image data obtaining processing, rotation processing or processing request processing based on property information, and display processing for the rotated image data by a client device.

In step S111, the client device requests the server to send image data. In step S112, the client receives image data and property information, which serves as attribute information, as XML data from the server. Then, in step S113, the client generates image information reflecting the image data and property information according to a display program based on the received information, and displays the generated image information.

The image information includes, as shown in FIG. 6, rotation information generated based on the original angle in the property information, and allows the user to understand which degrees the correct image data or the original image data is rotated with respect to the displayed image data received from the server.

Then, it is determined in step S114 whether the direction of the image data displayed on the display of the client device can be changed to that of the original image at the client side. If the outcome of step S114 is YES, in step S115, the rotation processing is performed in accordance with the rotation angle based on the property information. In step S116, the rotated image is displayed on the display.

On the other hand, if it is determined in step S114 that the image rotation processing cannot be performed at the client side, the process proceeds to step S121 in which the client outputs an image rotation processing request to the server. In the image rotation processing request, the above-described convert code is set as the property [image conversion processing (image Convert Settings)] value. The set value is a value corresponding to the original angle contained in the property information received from the server.

In step S122, the client receives image data rotated by the server, and in step S116, the rotated image, for example, the data shown in FIG. 9, is displayed on the display.

Figure 11:
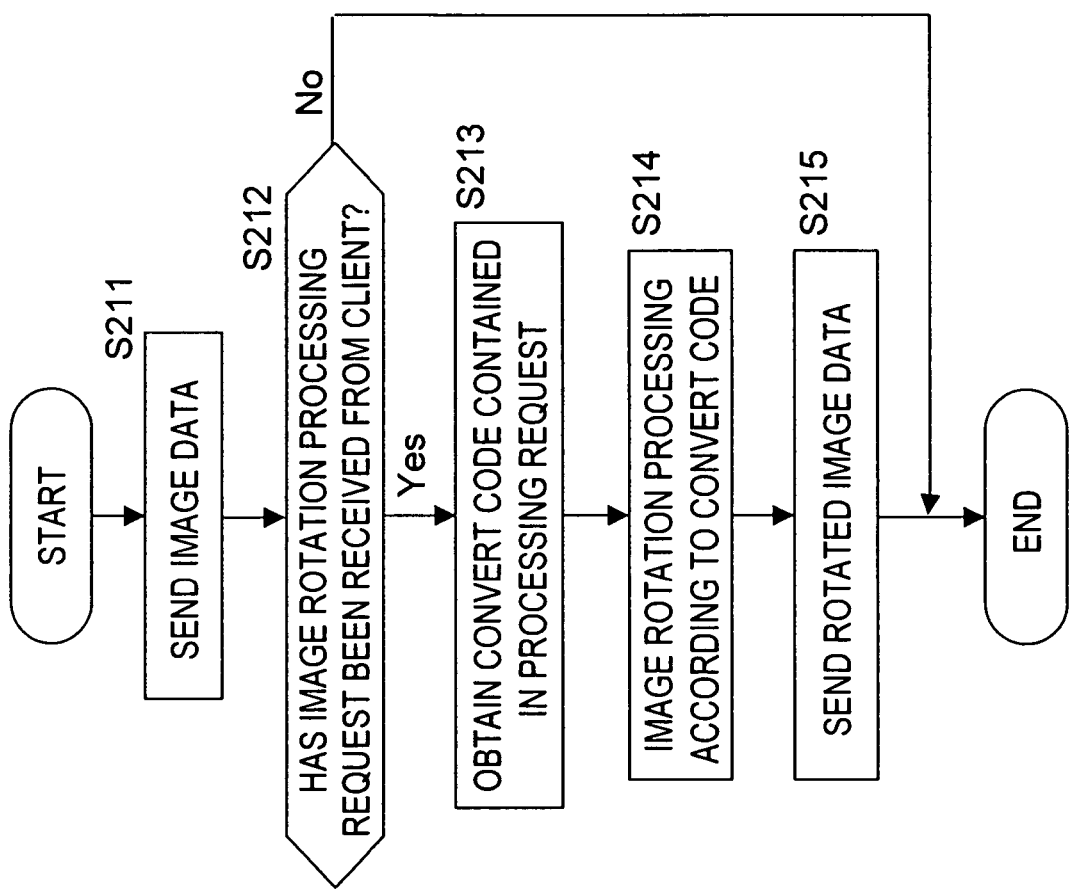
FIG. 11 is a flowchart illustrating a procedure of sending image data, rotation processing based on a rotation processing request from a client, and resending a rotated image by a server.

A description is given below, with reference to FIG. 11, of a procedure of sending image data, receiving an image-data rotation processing request from the client device, and performing rotation processing by the server.

In step S211, the server sends image data in response to a content request from the client. In step S212, the server determines whether an image rotation processing request has been received from the client. If a request has not been received, the processing is terminated.

If a rotation processing request has been received from the client, in step S213, the server obtains the set value, i.e., the convert code, of the property [image conversion processing (image Convert Settings)] stored in the received packet. In step S214, the server performs rotation processing in accordance with the value of the obtained convert code according to the image processing program in the server.

In step S215, property information, which serves as attribute information of the image data, is added to the rotated image data, and the image data with the property information is sent as XML data.

[Functional Configuration of Server and Client]

The hardware configuration of the server and the client device has been discussed with reference to FIG. 2. The above-described various processing jobs are executed by the CPUs, which serve as controllers, according to the programs stored in the corresponding storage devices of the server and the client.

The processing jobs executed by the controller, for example, of the server, include processing for sending image data as content in response to a request from the client, obtaining metadata associated with the sent image data and generating XML data based on the property information, and image rotation processing based on an image rotation processing request from the client.

The processing jobs executed by the client include processing for displaying image data and image information on the display based on the image data and property information received from the server, image rotation processing according to the image processing program of the client device, and processing for generating and sending an image rotation processing request to the server.

Basically, the above-described processing jobs are executed under the control of the CPUs, which serve as the controllers of the server and the client device. The functional configurations of the server and the client required for executing the aforementioned processing jobs are described below with reference to FIGS. 12 and 13, respectively.

Figure 12:
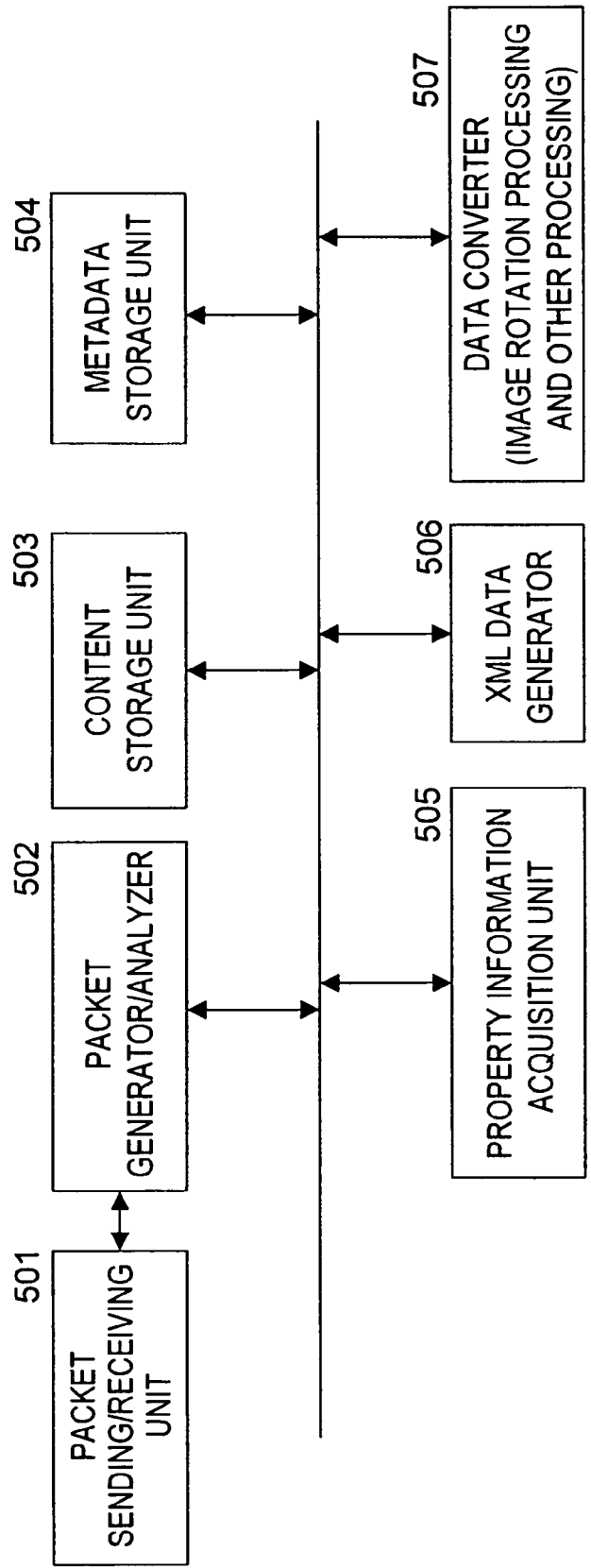
FIG. 12 is a block diagram illustrating processing functions of a server.

FIG. 12 is a block diagram illustrating the main functional configuration of the server. A packet sending/receiving unit 501 receives packets to be sent to or received from the client. A packet generator/analyzer 502 performs processing for generating packets to be sent and analyzing received packets. The processing includes packet address setting, packet address recognition, storing data in a data portion, obtaining data from the data portion, etc.

A content storage unit 503 stores content owned by the server. The content includes various types of content, such as image data and audio data. A metadata storage unit 504 is a storage unit storing metadata as attribute information associated with content.

As stated above, the metadata storage unit 504 stores property information forming metadata, and the property information includes, as shown in FIG. 5, original angle information indicating the direction of the correct image of the image data.

A property information acquisition unit 505 extracts the metadata associated with the content from the metadata storage unit 504 based on a content acquisition request or a property information acquisition request from the client.

An XML data generator 506 generates XML data to be sent to the client based on the metadata obtained by the property information acquisition unit 505. A data converter 507 converts the original content stored in the server into a data format requested by the client. More specifically, the data converter 507 obtains the set value, i.e., the convert code, of the property [image conversion processing (image Convert Settings)] stored in a rotation processing request packet from the client, and performs rotation processing in accordance with the value of the obtained convert code.

The functional configuration of the client device is described below with reference to FIG. 13. A packet sending/receiving unit 601 receives packets to be sent to the server and packets from the server. A packet generator/analyzer 602 performs processing for generating packets to be sent and analyzing received packets. The processing includes, not only analyzing data stored in the packets, but also packet address setting, packet address recognition, storing data in a data portion, obtaining data from the data portion, etc.

A storage unit 603 stores content, for example, image data, and property information included in a packet received form the server.

An output unit 604 is, for example, a display displaying the information shown in FIG. 6 or 9, and includes a speaker and a display used for content playback processing. An input unit 605 includes a keyboard or other data input means used for inputting various designation information for performing rotation processing for displaying image data.

An XML data analyzer 606 analyzes XML data including property information received from the server, generates display information discussed with reference to FIGS. 6 and 9 based on the analyzed data, and outputs the display information to the display, which serves as the output unit. The XML data analyzer 606 also obtains the original angle information contained in the property information received from the server, and if the client can perform rotation processing, the XML data analyzer 606 informs the rotation angle information of a data converter 607.

The data converter 607 obtains from the XML data analyzer 606 the original angle information contained in the property information received from the server, and performs image data rotation processing based on the obtained information. The data converter 607 also has a function of decoding compressed data if the image data received from the server is compressed data, such as JPEG or MPEG. The decoded and rotated image data is displayed on the display forming the output unit 604.

Figure 13:
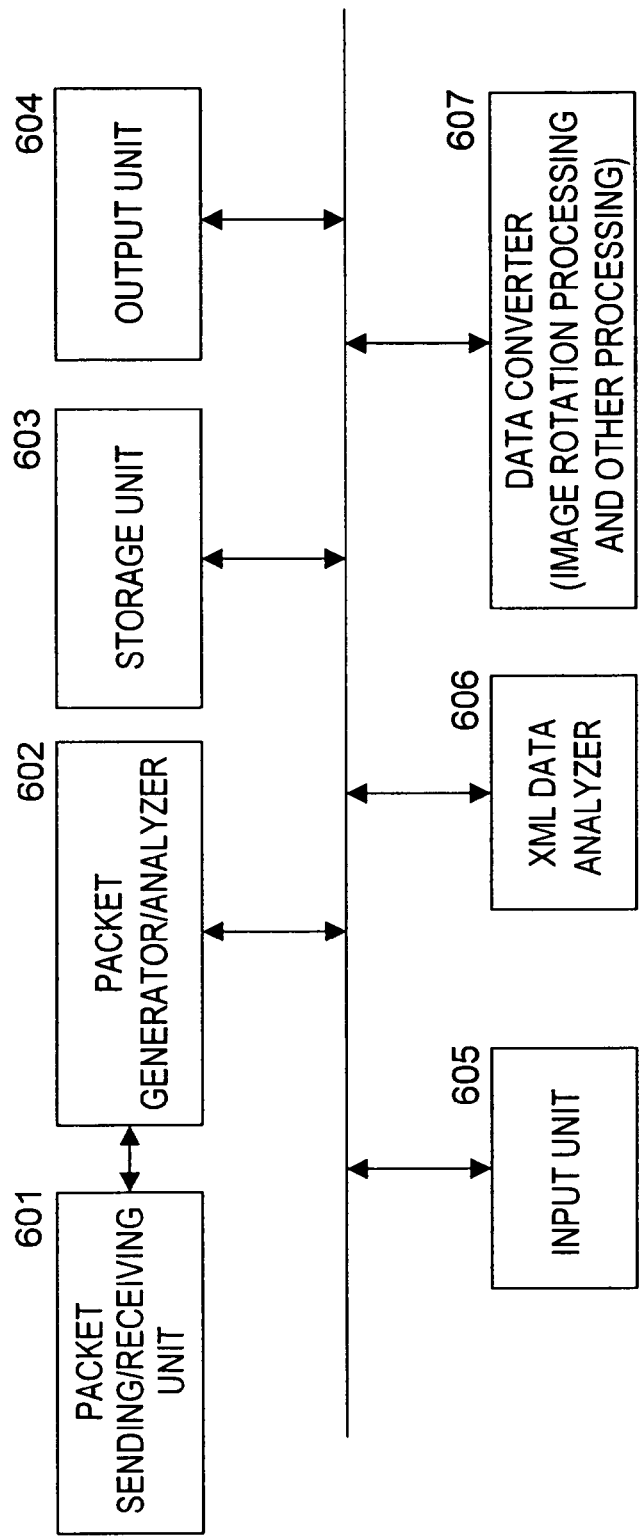
FIG. 13 is a block diagram illustrating processing functions of a client.

The server and the client have the functions shown in FIGS. 12 and 13, respectively, to execute the above-described processing jobs. However, the block diagrams shown in FIGS. 12 and 13 are functional block diagrams, and in actuality, the various processing programs are executed under the control of the CPU of the hardware configuration of, for example, a PC, shown in FIG. 2.

While the present invention has been described in detail with reference to exemplary embodiments, it is apparent that modifications and alternations can be made by those who skilled in the art without departing from the spirit of the invention. That is, the embodiments are illustrative and not restrictive. The scope of the following claims is to be accorded the broadest interpretation of the gist of the invention.

A series of processing jobs described in the specification can be executed by hardware, software, or a combination of hardware and software. If software is used, a program recording a processing sequence therein can be installed into a memory within a computer built in dedicated hardware or into a general-purpose computer that can execute various processing jobs, thereby allowing the computer to execute the program.

The program may be prerecorded in a hard disk or a ROM (Read Only Memory) as a recording medium. Alternatively, the program may be temporarily or permanently stored (recorded) in a removable recording medium, such as a flexible disk, a CD-ROM (Compact Disc Read Only Memory), an MO (Magneto optical) disk, a DVD (Digital Versatile Disc), a magnetic disk, or a semiconductor memory. Such a removable recording medium can be provided as so-called "package software".

The program may be installed into a computer from the above-described removable recording medium. Alternatively, the program may be transferred to a computer wirelessly from a download site or by wired means to a computer via a network, such as a LAN (Local Area Network) or the Internet. The computer then receives the transferred program and installs it in a recording medium, such as a built-in hard disk.

The various processing jobs described in the specification may be executed in chronological order disclosed in the specification. Alternatively, they may be executed in parallel or individually according to the necessity or the performance of the device to execute the processing. In this specification, a system is a logical set of a plurality of devices, and it is not essential that the devices be in the same housing.

INDUSTRIAL APPLICABILITY

As described above, according to the configuration of the present invention, a content providing server generates content information based on original angle information indicating the correct direction of image content and sends the content information to a client. This allows the client to understand the correct direction of the image content received from the server and to display image data in the correct direction by performing rotation processing based on the information in the client device or requesting the server to perform the rotation processing.

According to an example of the configuration of an embodiment of the present invention, a client generates display information including original angle information, which indicates the correct direction of image content, contained in property information, which is an element of the content information received from the server, and displays the generated display information. This allows the user to adjust the direction of the display image to that of the correct image based on the display information.

According to an example of the configuration of an embodiment of the present invention, a client obtains original angle information indicating the correct direction of image content as property information concerning image content received from the server, and performs rotation processing for adjusting the direction of the image data received from the server to that of the correct image, and outputs the corrected image data to the output unit. Thus, the corrected image can be provided to the client without the need for the user to perform processing.

According to an example of the configuration of an embodiment of the present invention, a client obtains original angle information indicating the correct direction of image content as property information concerning image content received from the server, and sends a rotation processing request packet storing rotation angle information corresponding to the original angle information to the server. Thus, the corrected image can be received from the server and is displayed on the client display even if the client does not have an image rotation processing function.

The invention claimed is:

1. A client in communication with a server over a communication network, the client configured to display image content received from the server, the image content including a still image or a moving picture, the client comprising:
a receiving unit configured to receive, from the server over the network, the image content and metadata associated with the image content, the metadata including an original screen display rotation of the image content relative to a rotation of the image content as received from the server;
a metadata processing unit configured to acquire the original screen display rotation from the metadata, and to generate rotation control data for rotating the image data based on the original screen display rotation;
an image processing unit configured to:
determine whether the client is configured with an image rotation processing function;
when it is determined that the client is not configured with an image rotation processing function, send from the client to the server over the network a request to rotate the image content at a server side based on the original screen display rotation and to send the rotated image content to the client, the request including the rotation control data, wherein the requested rotation is performed by the server in response to the request and using the rotation control data, and the rotated image content is sent by the server to the client over the network for display; and
when it is determined that the client is configured with an image rotation processing function, rotate the image content at a client side based on the original screen display rotation using the rotation control data; and
a display unit configured to display the rotated image content.

2. The client according to claim 1, wherein the rotation control data indicates a magnitude, in degrees, and a direction in which the image content must be rotated to obtain an image displayed at the original rotation, and
the rotation includes rotating the received image content by the magnitude and in the direction indicated by the rotation control data.

3. An image content display method performed by a client in communication with a server over a network, the image content including a still image or a motion picture, the method comprising:
receiving, from the server over the network, the image content and metadata associated with the image content, the metadata including an original screen display rotation of the image content relative to a rotation of the image content as received from the server;
acquiring from the metadata the original screen display rotation of the image content;
generating rotation control data for rotating the image data based on the acquired correct screen display rotation;
determining whether the client is configured with an image rotation processing function;
when it is determined that the client is not configured with an image rotation processing function, sending from the client to the server over the network a request to rotate the image content at a server side based on the original screen display rotation and to send the rotated image content to the client, the request including the rotation control data, wherein the requested rotation is performed by the server in response to the request and using the rotation control data, and the rotated image content is sent by the server to the client for display;
when it is determined that the client is configured with an image rotation processing function, rotating the image content at a client side based on the original screen display rotation using the rotation control data; and
displaying the rotated image content.

4. The method according to claim 3, wherein the rotation control data indicates a magnitude, in degrees, and a direction in which the image content must be rotated to obtain an image displayed at the original rotation; and the rotation processing includes rotating the image content at the magnitude and in the direction indicated by the rotation control data.

5. A non-transitory computer-readable medium having a program stored thereon which, when executed by a client in communication with a server over a network, causes the client to perform an image content display method, the image content including a still image or a moving picture, the method comprising:

receiving, from the server over the network, the image content and metadata associated with the image content, the metadata including an original screen display rotation of the image content relative to a rotation of the image content as received from the server;

acquiring from the metadata the original screen display rotation of the image content;

generating rotation control data for rotating the image data based on the acquired correct screen display rotation;

determining whether the client is configured with an image rotation processing function;

when it is determined that the client is not configured with an image rotation processing function, sending from the client to the server over the network a request to rotate the image content at a server side based on the original screen display rotation and to send the rotated image content to the client, the request including the rotation control data, wherein the requested rotation is performed by the server in response to the request and using the rotation control data, and the rotated image content is sent by the server to the client for display;

when it is determined that the client is configured with an image rotation processing function, rotating the image content at a client side based on the original screen display rotation using the rotation control data; and displaying the rotated image content.

\* \* \* \* \*